(12) United States Patent
Wulff et al.

(10) Patent No.: US 6,571,517 B2
(45) Date of Patent: Jun. 3, 2003

(54) ANIMAL GUARD

(76) Inventors: Joseph W. Wulff, Rte. 1, Box 6801 Highway HH, Hallsville, MO (US) 65266; Douglas J. Wulff, 506 A Columbia Dr., Columbia, MO (US) 65201

( * ) Notice: Subject to any disclaimer, the term of this patent is extended or adjusted under 35 U.S.C. 154(b) by 0 days.

(21) Appl. No.: 10/196,021

(22) Filed: Jul. 16, 2002

(65) Prior Publication Data

US 2003/0009957 A1 Jan. 16, 2003

Related U.S. Application Data

(60) Provisional application No. 60/305,815, filed on Jul. 16, 2001.

(51) Int. Cl.$^7$ .................................................. E04H 9/16
(52) U.S. Cl. ......................................... 52/101; 119/514
(58) Field of Search ............................ 52/101; 119/512, 119/513, 514

(56) References Cited

U.S. PATENT DOCUMENTS

| | | | |
|---|---|---|---|
| 4,867,104 A | | 9/1989 | Vandiver |
| 5,293,721 A | | 3/1994 | Richard et al. |
| 5,894,818 A | * | 4/1999 | Betzen .................. 52/101 |
| 5,918,404 A | * | 7/1999 | Ohba ..................... 52/101 |

* cited by examiner

Primary Examiner—Carl D. Friedman
Assistant Examiner—Nahid Amiri
(74) Attorney, Agent, or Firm—Lathrop & Gage L.C.

(57) ABSTRACT

An animal guard with a multitude of rotatable elements that can be securely mounted on a generally vertical or horizontal structure is disclosed. The rotatable elements may be of varying shapes and are designed to provide an unsteady footing for animals attempting to cross the object to continue travel along the structure. In accordance with one embodiment, the animal guard is configured to surround a vertically-extending structure. A series of hollow rotatable elements, or "spinners", are provided with a hole formed at opposing longitudinal ends. The spinners are bifurcated into two generally equal halves that attach together. A guard plate is mounted to surround the structure and has a series of cross arm brackets which extend through the end holes of the spinners to serve as end axles for rotation and to position the spinners around the circumference of the structure. A support means secures the location of the guard plate and spinners and couples the guard plate to the structure. Another embodiment of the animal guard inhibits animal passage along generally horizontal structures, such as cables, lines and wires. A series of hollow rotatable spinners are provided with a hole formed at opposing longitudinal ends. The spinners are bifurcated into two generally equal halves that attach together to secure the spinners around a horizontal structure. End shields are configured with a hole extending laterally therethrough to mount the end shields onto an end section of the spinners; one end shield is positioned at each of the opposite ends of a series of spinners. A gripping means is positioned adjacent to the end shields at the opposite end of the series of spinners to grip the horizontal structure and hold the end shields and spinners at fixed positions horizontally along the line.

17 Claims, 6 Drawing Sheets

ANIMAL GUARD

RELATED APPLICATIONS

This application claims priority to U.S. provisional application serial No. 60/305,815 filed Jul. 16, 2001, and is incorporated herein by reference.

FIELD OF INVENTION

The present invention relates generally to animal barriers, and more particularly, to a guard utilizing a series of rotatable elements to inhibit the passage of an animal along a structure, such as a cable or pole.

BACKGROUND OF INVENTION

Animals such as squirrels and other rodents often cause extensive damage to structures that carry electricity and telecommunications signals, as well buildings that are connected to such structures. Often, a rodent will climb up support poles or fencing and along lines or cables to reach a building or electrical structure onto which they inflict damage by clawing, chewing or short circuiting a power source. Roofs and attics of a residential home, electrical transformers where a potential difference in voltage is realized, coverings for power or communications lines, and other structures are examples of locations where animals cause damage.

Various animal barriers for power lines, communications lines, poles, fencing, electrical transformers and substations, guy wires, bird feeders, and other applications have been proposed. However, such barriers have failed to fully deter squirrels or other animals from climbing up vertical structures, such as poles or fencing, or crawling along a line or wire. Additionally, these barriers are often complicated to assemble, difficult to install and expensive.

Thus, what is needed is an animal guard for generally horizontally extending structures, such as lines, cables, or fence wiring, and vertically extending structures, such as utility poles and the like, that prevents and/or discourages the animal from attempting to pass the guard. The guard would ideally be lightweight, durable, easy to install, environmentally safe and not harmful to the animal and simple in operation to provide a reliable defense against animal damage to property.

SUMMARY OF THE INVENTION

The present invention provides an animal guard with a multitude of rotatable elements that can be securely mounted on a generally vertical or horizontal structure. The rotatable elements may be of varying shapes and are designed to provide an unsteady footing for animals attempting to cross the object to continue travel along the structure. The guard may also include other deterrents to further increase the effectiveness of preventing animal passage.

In accordance with one embodiment, the animal guard is configured to surround a generally vertically-extending structure, such as a pole. A plurality of hollow rotatable elements, or "spinners", are provided with a hole formed at opposing longitudinal ends. The spinners are bifurcated into two generally equal halves that attach together. A guard plate is mounted to surround the structure and has a series of cross arm brackets which extend through the end holes of the spinners to serve as end axles for rotation and to position the spinners around the circumference of the structure. A support means secures the location of the guard plate and spinners and couples the guard plate to the structure. By this design, an animal attempting to crawl up the structure will encounter the guard plate and rotatable elements surrounding the structure and will be obstructed from physically bypassing the guard plate and achieve steady footing on the rotatable elements to continue up the structure.

Another embodiment of the animal guard is provided for inhibiting animal passage along generally horizontal structures, such as cables, lines and wires. A series of hollow rotatable spinners are provided with a hole formed at opposing longitudinal ends. The spinners are bifurcated into two generally equal halves that attach together to secure the spinners around a horizontal structure. End shields are configured with a hole extending laterally therethrough to mount the end shields onto an end section of the spinners; one end shield is positioned at each of the opposite ends of a series of spinners. A gripping means is positioned adjacent to each of the outwardly facing sides of the end shields opposite of the series of spinners to grip the horizontal structure and hold the end shields and spinners at fixed positions horizontally along the line. As with the previous embodiment, an animal desiring to cross the guard will be obstructed from passage along the structure by the end shields and will be unable to achieve steady footing on the spinners.

Thus, the animal guard inhibits the travel of animals along certain structures to prevent the animals from accessing areas where they may do damage by chewing, clawing, short circuiting a power source with their body, etc. The rotatable devices employed inhibit an animal's ability to obtain steady footing when attempting to cross the guard.

DETAILED DESCRIPTION OF THE PRESENT INVENTION

Figure 1:
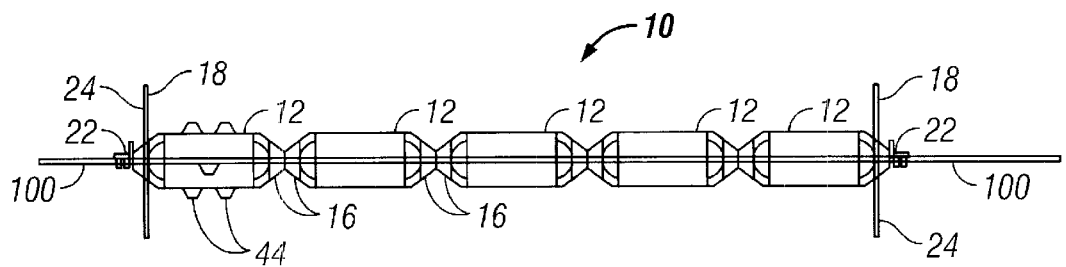
FIG. 1 is a side elevational view of an animal guard mounted on a horizontal line in accordance with one embodiment of the present invention.

One embodiment of the animal guard of the present invention is shown generally in FIG. 1 at 10. The guard comprises a series of rotatable elements 12, or "spinners", preferably hollow core, with a hole 14 formed at opposing longitudinal ends 16 and configured to surround the circumference of a generally horizontal line 100. The term "line" as used herein refers to any elongate, generally cylindrically-shaped structure, such as a power or communications line, cable, wire, and the like. At least two end shields 18 or wheels are provided to be mounted onto the spinners 12. One end shield 18 is ideally placed at each of the opposite ends of a series of spinners 12. A gripping means 22 is mounted onto the line 100 adjacent to an outwardly facing side 24 of each of the end shields 18 opposite of the series of spinners 12 to grip the line and prevent the spinners and end shields from separating horizontally on the line by sliding. The guard 10 thereby obstructs the movement of an animal traveling along the line 100 because the animal is unable to achieve sure footing on the rotating elements 12 and end shields 18. Further, the diameter of the end shields 18 ensures that the animal will not be able to leap over the whole animal guard assembly 10 to continue along the line 100.

It should be noted that in each figure illustrating the present invention, the spinners and end shields are shown to be transparent to show the detail inside these components. However, these components may in practice be translucent or opaque and be of a variety of colors.

Figure 2:
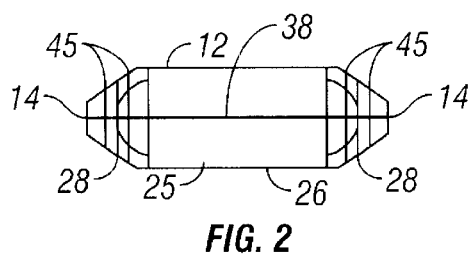
FIG. 2 is a side elevational view of one of the rotatable elements of FIG. 1.
Figure 3:
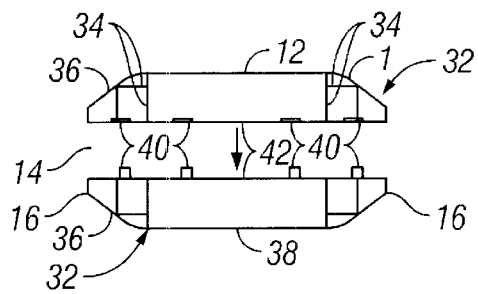
FIG. 3 is an exploded side elevational view of one of the rotatable elements of FIG. 1.
Figure 4:
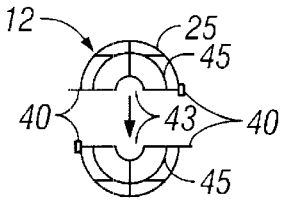
FIG. 4 is an exploded front elevational view of one of the rotatable elements of FIG. 1.

The spinners 12 are long, narrow shell-like objects that take the shape of an oval, football, cylinder, submarine, or any other similar shape that presents a curved outer surface 25 to an animal attempting to cross it and a low profile to minimize wind loading. Preferably, as shown in FIG. 2, the spinners 12 are of the submarine shape, with a center cylindrical portions 26 and conical end portions 28 having the end holes 14 formed therein. FIGS. 3 and 4 show the bifurcation of each spinner 12 longitudinally into two generally equal shell sections 32 and has a plurality of circumferential and longitudinal ribs 34 that strengthen and increase the rigidity of the shell wall 36. A number of weep holes or pores 38, preferably 4, extend through the shell wall 36 to evacuate condensation that may build up inside the spinner 12. A number of snap-fit closures 40 are disposed proximal to the shell wall edge 42, each closure 40 of one shell section 32 being received by an aligned, mating closure on the mating shell section, as shown in FIGS. 3 and 4, to form the complete spinner 12. The closures 40 are preferably formed of a barb and slot connection. Each shell section 32 has a semi-circular end trough 43 that mates with the channel of a mating shell section to form the end hole 14. When mounting the spinners 12 on an installed line 100, such as a telephone line or electrical transmission line, two mating shell sections 32 are aligned horizontally 100 along the line such that when the sections are snapped together on the line, the end holes 14 circumscribe the line and may spin freely thereon.

The spinners 12 are preferably made of UV resistant, injection moldable plastic, such as polypropylene. Extra animal deterrent qualities are gained by making the rotatable elements with a textured surface or fins 44 to make in uncomfortable for an animal to grip and apply weight while attempting to navigate a crossing of the guard, and by coloring the rotatable elements red and including coyote or fox urine scent, or other deterrents in the plastic for injection molding. The other deterrents may include items that present a bad taste or smell to the animal (i.e., irritants) without affecting the health or reproductive cycle of the animal, such as organics like cinnamon oil or cayenne pepper, discouraging an animal from touching and/or chewing through the spinners 12. However, it is to be understood that any variety of colors may be used that are known as a deterrent, or colors that are environmentally pleasing for the end user.

Exemplary dimensions of the spinners 12 are a maximum diameter of 4 to 12 inches and a length of 12 to 24 inches, preferably a diameter of 4 inches and a length of 12 inches. These sizes are effective to prevent most crawling animals, such as squirrels, from maintaining their balance while attempting to cross the spinners 12, but sufficiently small as to not induce an excessive weight or wind load on the line 100. The end holes 14 are dimensioned to circumscribe typical line diameters, such as 1, 2 or 3 inches. Preferably, the end holes 14 are pre-formed with a 1 inch diameter, and each spinner 12 has a circumferential cutaway groove 45 designating the location where the spinner can be cut along the groove to form the end hole with a 2 or 3 inch diameter. When the spinners 12 are mounted on an electrical transmission line 100, they can also be equipped with electromagnets (not shown) such that when the rotatable elements spin due to wind loads on the fins 44, electrical current is generated along the line to reduce loss.

The benefit of mounting the spinners 12 on a horizontal axis is that rotation about an axis in the horizontal plane forces the animal attempting to crawl over the spinners to encounter a downward rotation of each of the spinners weighted by the animal on either side of the horizontal line 100 for the entire length of the spinner. Each end hole 14 is generally centered in the transverse cross-sectional plane of the spinner 12, as shown in FIG. 4, to form an axis of rotation about which the spinner is generally evenly weighted. This ensures that an animal will have a difficult time balancing on the spinners 12 and avoiding rotation. Further, the curved outer surface 25 of the spinners 12 makes it difficult for an animal to grip the spinner when attempting to traverse the horizontal line 100.

Figure 5:
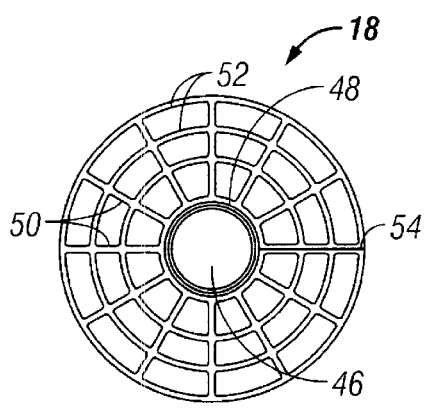
FIG. 5 is a front elevational view of one of the end barriers of FIG. 1.

FIG. 5 shows the preferred configuration for the end shields 18. The end shields 18 serve a number of purposes. First, the end shields 18 secure the series of spinners 12 to a narrow range of positions along a horizontal line 100, as seen in FIG. 1, such that the spinners do not become unduly separated horizontally along the line when wind loads are induced. Separation could allow an animal to leap over individual spinners 12 without having to embrace an entire series of spinners all at once. Additionally, because of their relatively large diameter, the end shields 18 prevent an animal from attempting to leap over a series of spinners 12 to travel further down the horizontal line 100. Further, the end shields 18 increase the difficulty of an animal attempting to slowly crawl onto a spinner 12 and balance the spinner without rotating it. With the shield 18 in place, the animal has to come off of the shield at a position vertically above or below the spinners 12, making it difficult to grip a spinner without causing it to rotate.

The end shields 18 generally take the form of a jump disc or wheel having a hole 46 defined by a center ring 48 with radially extending spokes or ribs 50 extending from the center ring supported by a number of concentric outer rings 52. A radial installation slot 54 extends from the center ring 48 to the outer-most outer ring 52, bisecting one of the spokes 50, to allow the shield 18 to be flexed laterally or tangentially to open the hole 46 such that the shield may be slipped over the conical end portion 28 of the spinners 12 for mounting thereon. In this fashion, the conical end portion 28 can also be referred to as a shield or wheel mounting ledge. Preferably, the closures 40 protrude above the spinner outer surface 25 to provide an interference fit with the center ring 48 of the end shield 18 when the shield 18 is unflexed after being slipped over the conical end portion 28 such that the shield is rigidly positioned on the spinner 12. A tie strap (not shown) or similar item can be tied around the spoke 50 that is bisected by the radial slot 54 to hold the end shield 18 to its circular shape and maintain its structural integrity.

The end shields 18 are generally much thinner in the lateral direction than the spinners 12 and have a diameter larger than the spinners to restrict access thereto by animals crawling along the line. Preferably, the end shields 18 have a diameter of about 12 inches to provide an effective animal barrier. The end shields 18 may also be made of UV resistant, injection moldable plastic, such as polypropylene, with the same animal deterrent features as described above for the spinners 12.

The spoked arrangement of the shields 18 generates a reduced wind load and weight on the line 100 as compared to a solid disk. The spokes 50 should be sufficiently close together along the circumference of the center ring 48 and outer rings 52 as to prevent an animal from crawling between the spokes to reach the spinners 12.

Figure 6:
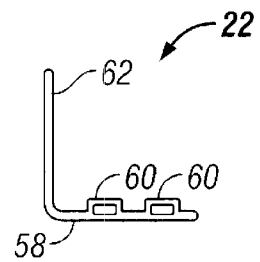
FIG. 6 is a side elevational view of one of the gripping means of FIG. 1.

The gripping means 22 is installed to abut the series of spinners 12 and end shields 18, as shown in FIG. 1. The gripping means 22 could include any type of clamp, catch or similar device, and preferably is a L-shaped bracket clamp fixedly attached to the line 100 to prevent the spinners 12 and end shields from spreading horizontally along the line 100. The details of the clamp 22 are best seen in FIG. 6. The base arm 58 of the clamp has a pair of raised slots 60 through which wire-ties (not shown) or similar tie straps may be extended and wrapped tightly around the line 100 to compress the clamp 22 against the line 100 to prevent movement thereof. The clamp 22 is aligned such that the vertical arm 62 abuts the spinner 12 and the base arm 58 rests on the line 100 with the slots 60 aligned perpendicular to the horizontal direction of the line. As with the end shields 18, one clamp 22 is positioned at each of the opposite ends of the series of spinners 12, as seen in FIG. 1. Preferably, the clamp 22 is made of UV resistant, injection moldable plastic, such as polypropylene, with the same animal deterrent features as described above for the spinners 12.

If the guard 10 of the present invention is to be installed sufficiently close to an end support 102 of the line 100, such as a fence post or a transmission line support, one of the clamps 22 may be omitted and the support 102 may serve to prevent the separation of the spinners 12 in one longitudinal direction along the line. The opposite clamp 22 would then prevent spinner 12 separation in the opposing longitudinal direction.

Figure 7:
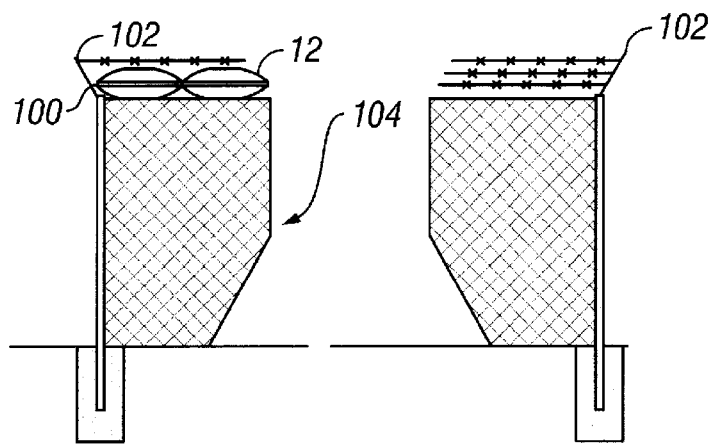
FIG. 7 is a side elevational view of the rotatable elements mounted on a fence wire in accordance with one embodiment of the present invention.
Figure 8:
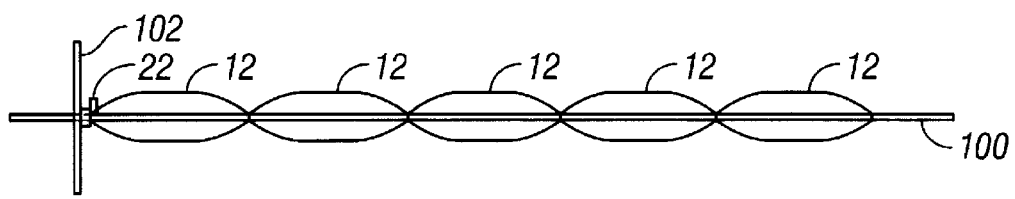
FIG. 8 is a side elevational view of an animal guard mounted adjacent to a support in accordance with one embodiment of the present invention.

In an exemplary embodiment where the animal guard 10 is used on horizontal fencing wire, or a similar arrangement, the wire 100 surrounded by the spinners 12 must be a smooth wire. FIG. 7 shows a fence 104 with fence post arm supports 102 at each end of the wire 100. The barbed wire that is to have rotatable elements mounted thereon must be removed and replaced with smooth wire 100 to allow the spinners 12 to freely spin around the longitudinal axis of the wire 100. Additional wires may have to be removed to allow sufficient clearance for the spinners 12 to spin without contacting adjacent wires. Ideally, enough spinners 12 should be placed on the wire 100 such that the rotatable elements extend from one fence post arm 102 to another with only a small clearance at each end. The preferred clearance above and below the spinners 12 to adjacent wires or fencing is about one-half of an inch. The supports 102 serve as an end blocks to keep the spinners 12 from sliding along the wire 18 due to wind loads, or alternatively, the gripping means 22 may be placed at each end of the series of spinners as shown in FIG. 8. In this arrangement, an end shield 18 is essentially unnecessary because the animal is typically attempting to climb up the fence and over the wire 100 and spinners 12 to access a forbidden area, instead of merely crawling horizontally along the wire and animal guard components. When an animal attempts to grip the spinners 12 from below, they spin in the downward direction, making them difficult to climb over.

For using the present invention on horizontal power or communications cable or lines, or any other horizontal line or wire arrangement where vertical supports 102 are spaced far apart, the arrangement of the spinners 12 and end shields 18 is provided. First, the base 58 of the L-shaped clamp 22 is affixed to the line 100 with the wire-ties near the point desired to be protected. The desired number of spinners 12 are then mounted onto the line 100 by snapping together each of the two mating shell sections 32. The number of spinners 12 chosen should take into account the space available on the line 100 between supporting structures, the distance necessary to keep animals from attempting to jump over the spinners, and the additional weight that the present invention adds to the line, among other factors. If the line 100 has a diameter of greater than 1 inch, the spinners 12 can be cut along the circumferential grooves 45 to form each of the opposing end holes 14 with a 2 or 3 inch diameter. The end shields 18 are then placed on the first and last spinners 12 of the series (e.g., at opposite horizontal ends of the series), by flexing the shields laterally or tangentially to open the hole 46 and slipping the center ring 48 over the conical end portion 28 of the spinners 12. Preferably, the center ring 48 is slid past the protruding closures 40 of the spinners 12 to provide an interference fit such that the shield 18 is rigidly positioned on the spinner 12. A tie strap is tied around the spoke 50 that is bisected by the radial slot 54 to hold the end shield 18 in place. Finally, a second L-shaped clamp 22 is installed on the opposite end of the series of spinners 12 to hold the assembly from sliding apart horizontally along the line 100.

The elements of the animal guard 10, including the spinners 12, end shields 18, and gripping means 22, for mounting to a horizontal structure can also be secured to non-horizontal lines of a power transformer or other electrically charged object so long as any electrically conductive elements of the invention are either spaced away from the "live" transformer elements or are touching an insulator. If the spinners 12 and shields 18 are made of plastic, they can be placed in contact with such "live" elements as long as they are not exposed to excessive heat and are of the type of plastic that would not initiate an electrical or corona discharge with the transformer elements.

Figure 9:
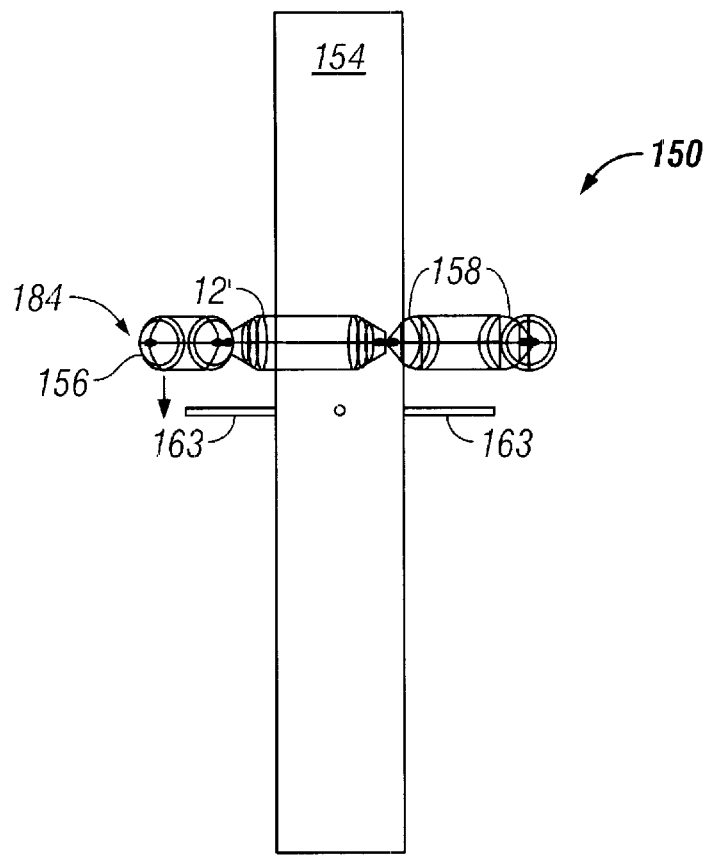
FIG. 9 is an illustrative view of an animal guard being mounted onto the support means in accordance with one embodiment of the present invention.
Figure 10:
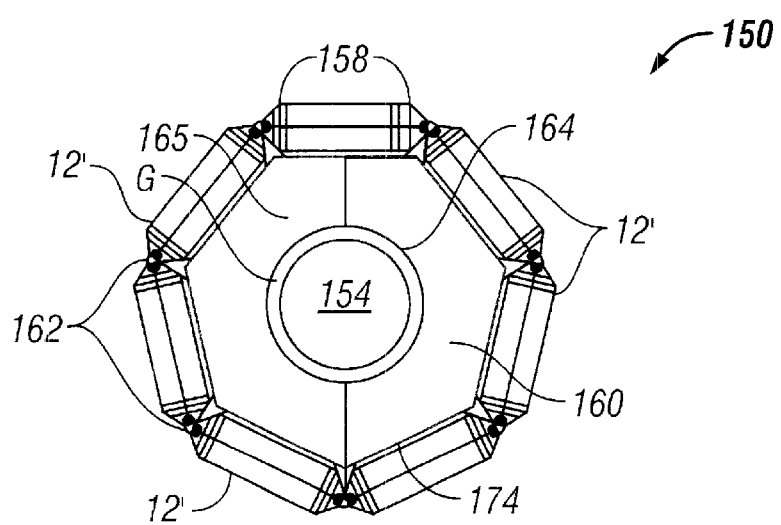
FIG. 10 is top plan view of the animal guard of FIG. 9 mounted onto a vertical pole.

In an embodiment for securing the animal guard 150 of the present invention to a generally vertical structure 154, such as a utility pole, a series of spinners 12', preferably having the same configuration as the spinners 12 mounted to the horizontal line 100, are provided to surround the perimeter of the pole 154 for obstructing the movement of an animal climbing up the pole, as seen in FIG. 9. The rotatable spinners 12' have a two-piece bifurcated design with a hole 156 formed at opposing longitudinal ends 158, essentially identical to the spinners 12 of FIGS. 2–4. A guard plate 160, as shown in FIG. 10, is configured to be mounted to surround the pole 154 and provides supports 162 about which the spinners 12' are rotatably mounted. A support means 163 secures the guard plate 160 to the pole 154.

Figure 11:
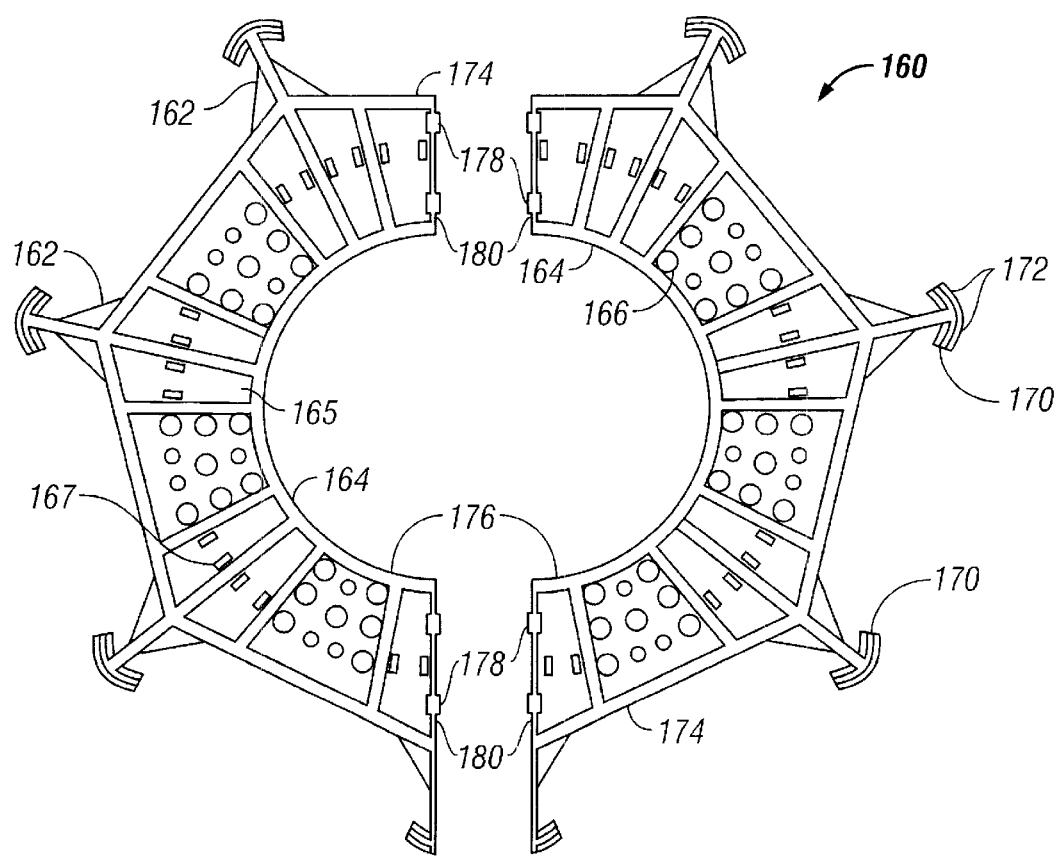
FIG. 11 is a close-up exploded view of the guard plate of FIG. 10.

FIG. 11 shows the detail of the guard plate 160, having a generally circular inner ring 164 concentric with the shape of the perimeter of the pole 154 being surrounded. The inner ring 164 may have a cutout portion (not shown) through which a conduit or other object may extend vertically up the pole 154. Preferably, the ring 164 geometry should be such that no more than about a one inch gap is form between the plate 160 and the pole 154. The guard plate 160 also has a main body section 165 with a plurality of holes 166 through which other conduits may be extends up the pole 154 depending on the needs of the user. Also, the holes 166 allow moisture to pass through to minimize water or ice accumulation on the main body 165 of the plate. Slots 167 are also provided in the body section 165 to allow tie-straps and the like to secure the guard plate 160 on the support means 163.

The supports 162 extending radially outward from the body section 165 of the guard plate 160 and form cross arm brackets 170 each having two generally opposing axle arms 172. Braces 173 are provided to support the brackets 170. The axle arms 172 have a circular cross-section and serve as a horizontally-aligned axle about which the spinners 12' rotate, as shown FIG. 10. The benefit of mounting the spinners 12' on horizontal axle arms 172 is that rotation about an axis in the horizontal plane forces the animal attempting to climb over the spinners to encounter a downward rotation, the opposite direction of where they need to go to bypass the guard 150. Each of the opposing holes 156 of a spinner 12' are mounted to one axle arm 172 such that two adjacent cross arm brackets 170 are needed to mount one spinner 12'. The spinners 12' mount onto the axle arms 172 in the same fashion as the spinners 12 mount onto the horizontal line 100 configuration. In a preferred arrangement shown in FIG. 10, each guard plate 160 has seven spinners 12' and seven cross arm brackets 170. The shape of an outer perimeter 174 of the plate 160 is such that only a small gap is formed between the spinners 12' and the plate 160, preferably about an inch or less.

The guard plate 160 preferably is fabricated as a two-piece design that is split into generally semi-circular pieces 176. A set of connectors 178 extend from the radial edges 180 of opposing semi-circular pieces 176 to mate with one another and rigidly couple the pieces together. In one embodiment, the connectors 178 may include vertically-aligned loops (not shown) that are configured to overlap one another such that tie-straps, rivets, or similar items may be extended therethrough for coupling the pieces 176 together. Alternatively, tie-straps may be extended through the holes 166 or slots 167 of the opposing semi-circular pieces 176.

The guard plate 160 may be made of a variety of materials, and preferably is made of an acetyl resin possessing high impact strength properties and UV resistance. Both the guard plate 160 and spinners 12' may have the same animal deterrent features as described above for the spinners 12, including taste, smell and sign irritants and/or deterrents to animals, such as squirrels and other rodents. Additionally, the guard plate 160 is preferably sized such that when the spinners 12' are removed from the plate, the radial dimension from the inner ring 164 to the outer perimeter 174 at a location away from the cross arm brackets 170 is only about 4½ inches. This allows a utility worker climbing the pole 154 to easily climb around the animal guard 150 to move higher up the pole to, for example, service transmission lines or transformers. The animal guard 150 should also be mounted a sufficient distance up the pole 154 such that an animal cannot jump from the ground onto the pole 154 at a location above the guard, and such that the guard is not disturbed by passing machinery and the like. Preferably, the animal guard 150 is mounted at least 12 feet above the ground level.

The inner ring 164 of the guard plate 160 is optimized for use with vertical pole 154 having a diameter of about 10 to 12 inches. If the animal guard 150 is desired for use with a smaller diameter structure, a properly sized flex conduit (not shown) can be inserted between the inner ring 164 and structure 154 to fill the gap G therebetween. The support means 163 can be any configuration that will rigidly couple the guard plate 160 to the pole 154, and preferably includes a set of pole mounting spikes or screws either driven or threaded into the pole 154 and extending radially outward therefrom. After the semi-circular guard pieces 176 are assembled together around the pole 154 to form the guard plate 160 with the spinners 12' mounted thereon, the entire assembly 184 is lowered onto the spikes 163, as shown in FIG. 9. The plate 160 could have a series of radial grooves (not shown) formed onto an underside of the plate such that the spikes 163 would fit into the grooves. Preferably, tie-straps (not shown) are extended through adjacent slots 167 and underneath the spikes 163 and firmly tied to attach the assembly 184 to the spikes and prevent rotation of the assembly around the pole 154.

It is also to be understood that the animal guard 150 of the present invention may work with structures having a polygon cross-section in addition to those of a circular configuration. In this way, the inner ring 164 of the guard plate 160 would preferably have a polygon shape as an alternative to a circular configuration, to minimize gaps where an animal could climb between the guard plate 160 and the structure 154.

Figure 15:
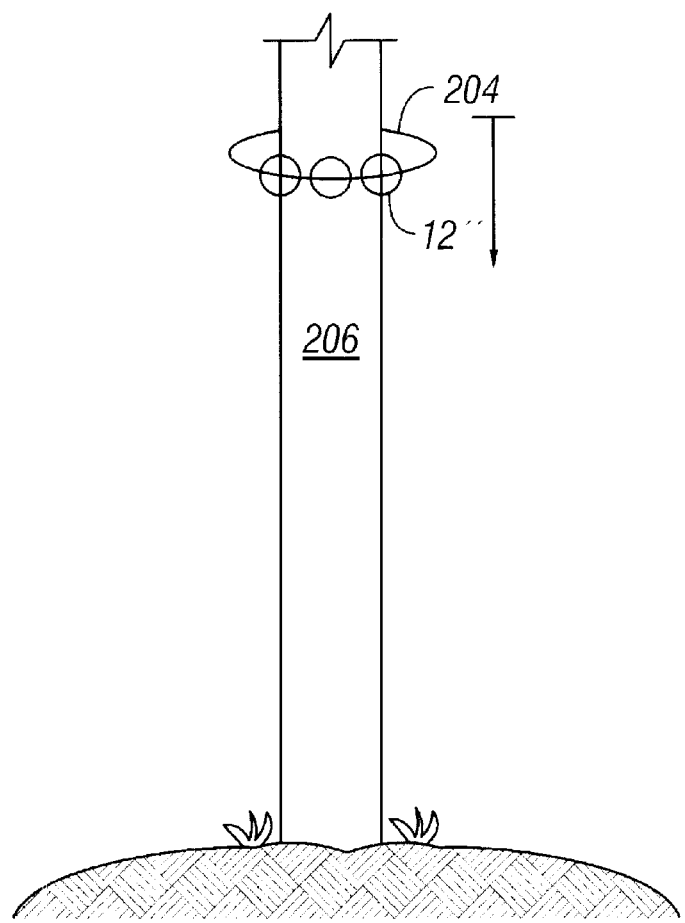
FIG. 15 is a partial illustrative view of an animal guard of FIG. 12A mounted to a vertical structure.

In an alternative arrangement of the present invention, the animal guard 200 does not have a guard plate 160, and the rotatable spinners 12" are mounted on an axle 204 circumscribing a vertical structure 206, such as a utility pole, to leave only a small gap between the spinners and the structure, as shown in FIGS. 12A through 12E. The spinners 12" may be the same as the spinners 12' of the previous embodiment, but preferably have a spherical or disk-like shape. Alternatively, the spinners 12" could be formed with a center hole or bore 207 extending therethrough to mount such elements on the axle 204. The bore 207 is generally centered through the spinner 12" to form an axis of rotation about which the spinner is evenly weighted. This ensures that an animal will not be able to balance on the spinner 12" and avoid rotation unless it is directly above or below the axis of rotation, which is nearly impossible for an animal attempting to grip rotatable elements to climb over them. A support means 208 is also provided to secure the spinners 12" and axle 204 to the pole 206 while ensuring the free, uninhibited rotation of the spinners when gripped by an animal. Preferably, the animal guard 200 is mounted at least 12 feet above the ground level, as illustratively shown in FIG. 15.

For the configurations shown in FIGS. 12A through 12D, the spinners 12" are preferably hollow spheres that can be provided with a textured surface to make in uncomfortable for an animal to grip and apply weight while attempting to climb over the animal guard 200. However, the spinners 12" could also take the shape of a cylinder, oval, submarine, football, or any other configuration presenting a significant portion with a curved surface, such as the disks of FIG. 12E. The spinners 12" are spaced apart on the axle 204, and laterally away from the pole 206, a sufficient distance as to provide clearance for the elements to rotate freely. It should be recognized, though, that the spinners 12" are not spaced so far apart from each other and away from the pole 206 that an animal would be allowed to climb around the elements to reach a higher area. Preferably, the axle 204 is mounted such that the spinners 12" are spaced about one-half to one inch from the pole 206 at the closest location. The spinners 12" are also preferably made of injection molded, UV resistant plastic having a shell thickness of about one-eighth of an inch. When the spinners 12" are spheres, the preferably range in diameter from 5 inches to 6.5 inches depending on the type of axle 204 used, although the diameter of the spheres can be much larger or smaller depending on what size is needed to surround pole 206 of various widths. The spinners 12" may have the same animal deterrent features as described above for the spinners 12, including taste, smell and sign irritants and/or deterrents to animals, such as squirrels.

Figure 13A:
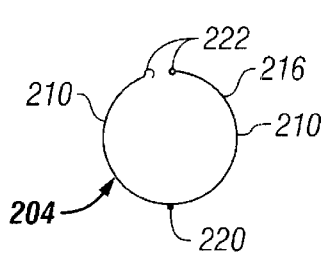
FIG. 13A is a top plan view of the circular axle ring of FIG. 12A.
Figure 13B:
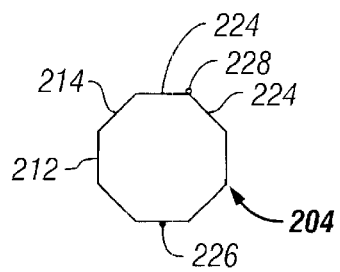
FIG. 13B is a top plan view of the polygonal axle ring of FIG. 12B.

Various configurations for the axle 204 are shown in FIGS. 13A and 13B. The axle 204 may take the shape of a circular ring 210 or polygonal ring 212, for example. The rings 210, 212 should be of a diameter as to position the spinners 12" around the pole 206 and at the correct distance therefrom. Additionally, the selection of the number of straight sections 214 or "sides" of the polygonal ring 212 depends on the size of the spinners 12" and the desired distance to position the spinners from the pole 206.

The circular ring 210 preferably comprises two generally half-circle aluminum rods 216 each configured to span 180 degrees around the perimeter of the post 206 and connected together with a hinge 220 at one end, and with a hook and spring system 222 at the opposing ends. The polygonal ring 212 comprises two half-polygon aluminum rods 224 each generally spanning around the pole 206 in the same fashion and connected together with a hinge 226 at one end, and with a hook and eyelet system 228 at the opposing ends. The hinges 220, 226 may be rivet or pin type, or any other similar arrangement.

Figure 12A:
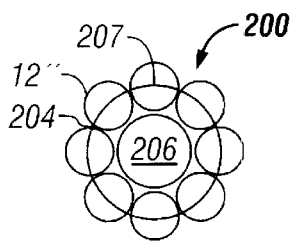
FIG. 12A is a top plan view of an animal guard having a circular axle ring and spheres mounted onto a vertical pole in accordance with one embodiment of the present invention.
Figure 12B:
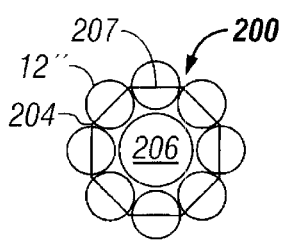
FIG. 12B is a top plan view of an animal guard having a polygonal axle ring and spheres mounted onto a vertical pole in accordance with one embodiment of the present invention.
Figure 12C:
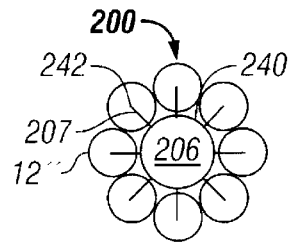
FIG. 12C is a top plan view of an animal guard having a ring with radially extending posts and spheres mounted onto a vertical pole in accordance with one embodiment of the present invention.
Figure 12D:
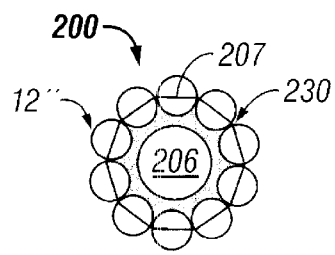
FIG. 12D is a top plan view of an animal guard having a polygonal axle ring, spheres and a fill plate mounted onto a vertical pole in accordance with one embodiment of the present invention.

If it is desired to position the spinners 12" further away from the perimeter of the pole 206 such that it would be more difficult for an animal to climb around them, a fill plate 230 may be positioned below the elements, as shown in FIG. 12D. The fill plate 230 surrounds the pole 206 and extends radially outward therefrom a sufficient distance as to block an animal from climbing between the structure and the spinners 12". Alternatively, the fill plate 230 could be positioned at the same vertical height as the spinners 12" and be shaped as to substantially fill any gaps formed between the elements and the pole 206 perimeter, and between each of the elements inside of the perimeter formed by the axle 204 (i.e. preferably leaving only about a one-half inch gap). The fill plate 230 is supported from beneath by a support strap 232 mounted on the pole 206, as shown in FIG. 14B. The strap 232 is preferably a plastic strap that is secured to the pole 206 with a number of radially, inwardly-extending pole spikes 234 located at various positions around the circumference of the strap. The strap 232 has an upper tapered edge 236 that matches the inside diameter of the fill plate 230 such that the plate rests securely on top of the strap. Preferably, the strap 232 is around 4 inches in height and has an inside diameter sufficient to extend around the pole 206.

Figure 13C:
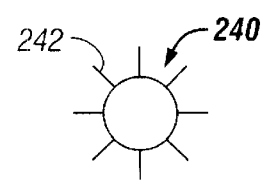
FIG. 13C is a top plan view of the ring with radially extending posts of FIG. 12C.

Another axle 204 configuration is shown in FIGS. 12C and 13C. The axle 204 comprises a circular ring and post roller assembly 240. The assembly 240 is similar to the circular ring 210, but adds radially extending posts 242 which are inserted into the bores 207 of the spinners 12".

Figure 12E:
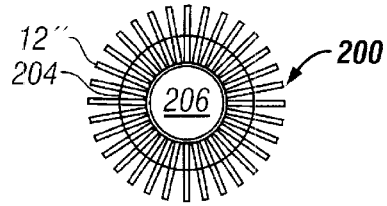
FIG. 12E is a top plan view of an animal guard having a circular axle ring and disks mounted onto a vertical pole in accordance with one embodiment of the present invention.

In another configuration shown in FIG. 12E, the spinners 12" comprise thin disks that have a flat shape in the radial plane of a circle, square, pentagon, star, or any other shape that can rotate uniformly around an axle 204. A sufficient number of disks are provided to ensure that a viable obstruction is in place for animals attempting to climb through the disks along the pole 206 or to grip the disks to move higher up the structure. As with the other spinners 12", the disks can be provided with a textured surface to make in uncomfortable for an animal to grip and apply weight while attempting to climb over the animal guard 200. The disks are spaced apart on the support axle 204, and laterally away from the pole 206, a sufficient distance as to provide clearance for the disks to rotate freely. The disks are also of a sufficient diameter as to provide a high rotational force if an animal attempts to grip the disks to move higher up the pole 206. Preferably, the disks have a diameter of about 7 inches and are spaced on the ring about one-half inch from the pole 206 at the closest location. As with the other spinners 12", the diameter of the disks can be much larger or smaller depending on what size is needed to surround poles 206 of various widths. The same animal deterrents used in the other spinners 12", namely red color and coyote or fox urine scent, can be used in the disks to serve as an added deterrent to animals. However, it is to be understood that any variety of colors may be used that are known as a deterrent, or colors that are environmentally pleasing for the end user. The disks are preferably injection molded UV resistant plastic having a shell thickness of about one-eighth of an inch.

Figure 14A:
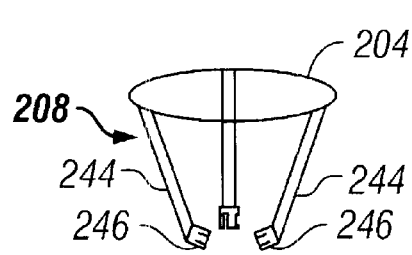
FIG. 14A is a perspective view of the support legs in accordance with one embodiment of the present invention.
Figure 14B:
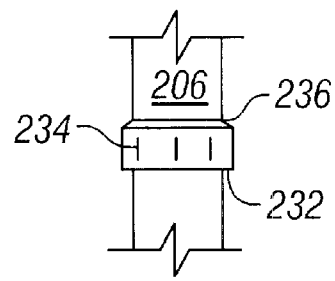
FIG. 14B is a side elevational view of the support strap mounted onto a vertical structure in accordance with one embodiment of the present invention.

As shown in FIG. 14A, the support means 208 is provided to mount the animal guard 200 to the pole 206, preferably comprises a plurality of support legs 244 extending downward from the axle 204. Each support leg 244 has a spike 246 or similar means to attach to the pole 206, such as a wooden utility pole. The legs 244 are preferably at least 18 inches long to provide a sturdy support for the axle 204 and spinners 12". Ideally, three legs are provided. Additionally, the legs 244 can also be hingedly attached to axle 204 to allow for easy installation and removal of the legs from the pole 206. As an alternative to support legs 102, other support means 208, such as bolts or other fasteners, may be welded or otherwise connected to the support axle 204 to mount the axle to the pole 206 to support the axle and spinners 12".

The present invention thus attains improved performance and reliability in an animal guard, impeding the travel of animals, such as rodents, along various structures. Since certain changes may be made in the above apparatus without departing from the scope of the invention, it is intended that all matter contained in the above description or shown in the accompanying drawings be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. An animal guard configured to extend around the perimeter of a horizontally-extending structure, comprising:
   a series of rotatable elements configured to accept the horizontally-extending structure therethrough for rotation about the structure;
   a pair of end barriers each having a center ring and a plurality of radial spokes extending from the center ring and at least one outer ring interconnecting the spokes, the enter ring being sized and configured for mounting with one of the rotatable elements; and
   a gripping means configured for mounting on the horizontally-extending structure to prevent the rotatable elements from separating longitudinally along the structure;
   whereby one end barrier is mounted on each of the opposite horizontal ends of the series of rotatable elements and the gripping means is mounted adjacent to each of the end barriers.

2. The animal guard of claim 1, wherein at least two of the elements have a center region and an end region with a transverse cross-sectional dimension less than that of the center region, the end region configured to accept the end barrier for mounting thereon.

3. The animal guard of claim 1, wherein each rotatable element comprises two mating shell sections each having connectors disposed along a shell wall for coupling the sections together to form a rotatable element, and having a trough at opposing ends of each shell section to form a hole with a mating shell for extending around the horizontally-extending structure for rotation thereabout.

4. The animal guard of claim 1, wherein the end barriers further have a radially extending slot extending along one of the plurality of radial spokes from the center ring to an outer perimeter of the end barrier to allow for expansion of the center ring upon the application of a lateral or tangential force such that the center ring can be extended over a portion of the rotatable element having a larger diameter than the unexpanded center ring for mounting thereon.

5. The animal guard of claim 1, wherein the rotatable elements are red in color to deter animals from crossing the guard.

6. The animal guard of claim 1, wherein the rotatable elements are made of a UV resistant plastic and impregnated with at least one of coyote and fox urine scent to deter animals from crossing the guard.

7. The animal guard of claim 1, wherein the horizontally-extending structure is an electrical transmission line, and wherein the rotatable elements further have fins and electromagnets disposed thereon, whereby the fins facilitate the spinning of the rotatable elements around the transmission line upon receiving a wind load to allow the electromagnets to work with the line carrying electrical current to generate a magnetic field to reduce loss along the line.

8. The animal guard of claim 1, wherein the gripping means comprises a bracket clamp having a base arm and a vertical arm, the base arm having one or more slots for accepting ties therethrough to affix the base arm to the horizontally-extending structure.

9. An animal guard, comprising:
   a series of rotatable elements configured to accept a horizontally-extending structure therethrough for rotation about the structure;
   one or more end barriers having a center ring and a plurality of radial spokes extending from the center ring and at least one outer ring interconnecting the spokes, the center ring being sized and configured for mounting with one of the rotatable elements; and
   a gripping means configured for mounting on the horizontally-extending structure to prevent the rotatable elements from separating longitudinally along the structure;
   whereby at least one of he one or more end barriers is mounted with a corresponding horizontal end of the series of rotatable elements and the gripping means is mounted adjacent to the at least one of the one or more end barriers.

10. The animal guard of claim 9, wherein the one or more end barriers comprise two end barriers, each end barrier positioned at opposite horizontal ends of the series of rotatable elements, and one gripping means is mounted adjacent to each of the end barriers.

11. The animal guard of claim 9, wherein at least two of the elements have a center region and an end region with a transverse cross-sectional dimension less than that of the center region, the end region configured to accept the end barrier for mounting thereon.

12. The animal guard of claim 9, wherein each rotatable element comprises two mating shell sections each having connectors disposed along a shell wall for coupling the sections together to form a rotatable element, and having a trough at opposing ends of each shell section to form a hole with a mating shell for extending around the horizontally-extending structure for rotation thereabout.

13. The animal guard of claim 9, wherein the one or more end barriers further have a radially extending slot extending along one of the plurality of radial spokes from the center ring to an outer perimeter of the one or more end barriers to allow for expansion of the center ring upon the application of a lateral or tangential force such that the center ring can be extended over a portion of the rotatable element having a larger diameter than the unexpanded center ring for mounting thereon.

14. The animal guard of claim 9, wherein the rotatable elements are red in color to deter animals from crossing the guard.

15. The animal guard of claim 9, wherein the rotatable elements are made of a UV resistant plastic and impregnated with at least one of coyote and fox urine scent to deter animals from crossing the guard.

16. The animal guard of claim 9, wherein the horizontally-extending structure is an electrical transmission line, and wherein the rotatable elements further have fins and electromagnets disposed thereon, whereby the fins facilitate the spinning of the rotatable elements around the transmission line upon receiving a wind load to allow the electromagnets to work with the line carrying electrical current to generate a magnetic filed to reduce loss along the line.

17. The animal guard of claim 9, wherein the gripping means comprises a bracket clamp having a base arm and a vertical arm, the base arm having one or more slots for accepting ties therethrough to affix the base arm to the horizontally-extending structure.

* * * * *

UNITED STATES PATENT AND TRADEMARK OFFICE
CERTIFICATE OF CORRECTION

PATENT NO.   : 6,571,517 B2
DATED        : June 3, 2003
INVENTOR(S)  : Joseph W. Wulff et al.

It is certified that error appears in the above-identified patent and that said Letters Patent is hereby corrected as shown below:

Column 11,
Line 19, delete "enter" and insert therefor -- center --.

Column 12,
Line 15, delete "he" and insert therefor -- the --.

Signed and Sealed this

Nineteenth Day of August, 2003

JAMES E. ROGAN
*Director of the United States Patent and Trademark Office*